E. L. STIMSON.
MOLD FOR MAKING HOLLOW RUBBER ARTICLES.
APPLICATION FILED NOV. 11, 1915.
1,195,412.
Patented Aug. 22, 1916.
2 SHEETS—SHEET 1.
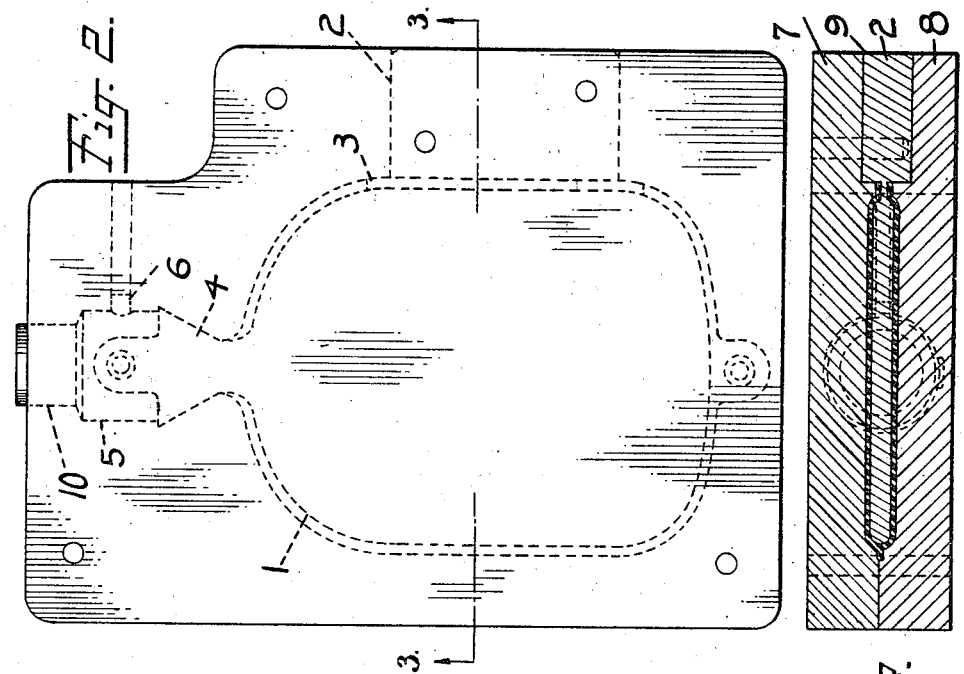
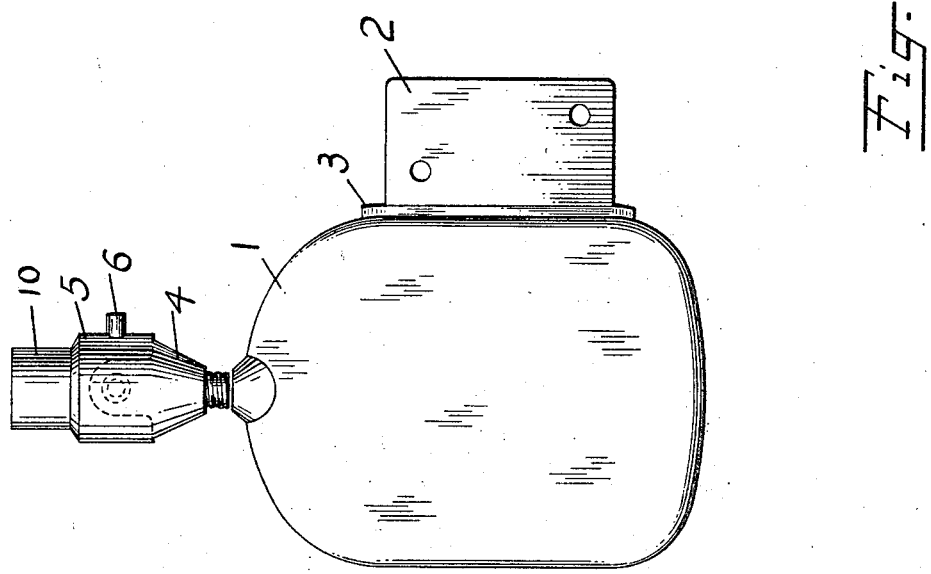
WITNESS:
S. H. Taylor
INVENTOR
E. L. Stimson,
BY
Ernest Hopkinson
HIS ATTORNEY

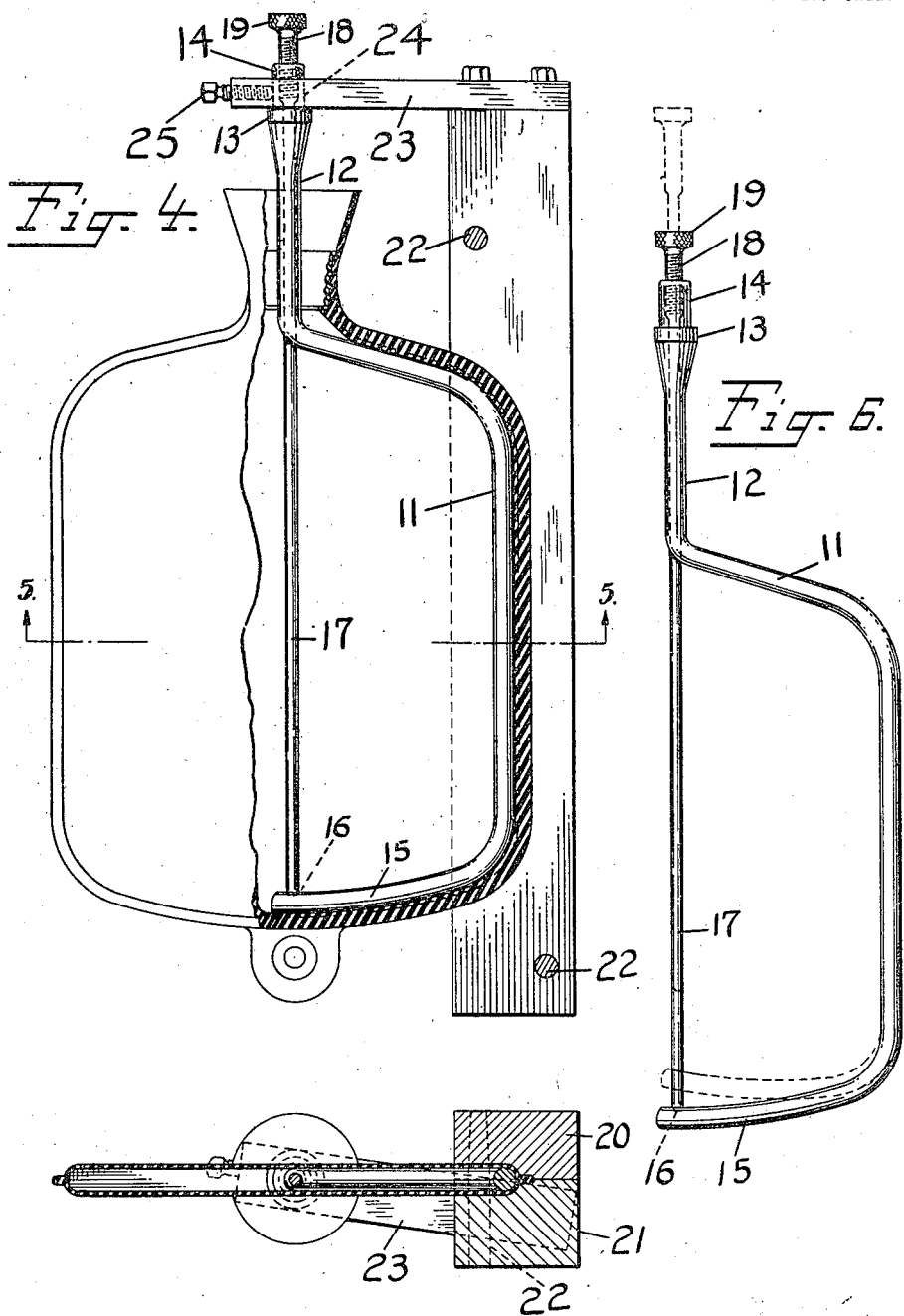

UNITED STATES PATENT OFFICE.

EDWIN L. STIMSON, OF CLEVELAND, OHIO, ASSIGNOR TO THE MECHANICAL RUBBER CO., A CORPORATION OF NEW JERSEY.

MOLD FOR MAKING HOLLOW RUBBER ARTICLES.

1,195,412.  Specification of Letters Patent. Patented Aug. 22, 1916.

Application filed November 11, 1915. Serial No. 60,971.

*To all whom it may concern:*

Be it known that I, EDWIN L. STIMSON, a citizen of the United States, residing at Cleveland, in the county of Cuyahoga, State of Ohio, have invented certain new and useful Improvements in Molds for Making Hollow Rubber Articles, of which the following is a full, clear, and exact description.

My invention relates to hollow rubber articles, particularly those with small openings or necks through which a core cannot conveniently be removed, such as hot water bottles made of rubber.

My invention comprises a mold or apparatus, whereby when the core of a mold is removed through the side or edge of the bottle, the edge having the opening through which the core was removed may be thereafter vulcanized in a special mold having a special core, which will be hereafter more fully set forth.

By the use of my improved method and apparatus a hot water bottle or similar article is produced, which is substantially a molded article without joint and one in which the usual method of cementing the edges is obviated.

For a detailed description of one form of my invention, reference may be had to the following specification and to the accompanying drawings, in which:

Figure 1 is a plan view of the body core and neck core of a hot water bottle. Fig. 2 is a plan view of the external mold therefor. Fig. 3 is a transverse sectional view of the mold and core, taken substantially on the line 3—3, Fig. 2. Fig. 4 is a plan view, partially in section, showing the internal core for the margin of the bottle in position in a mold for the edge of the bottle containing the opening through which the body core has been removed. Fig. 5 is a transverse sectional view of the same taken on the line 5—5, Fig. 4; and Fig. 6 is a plan view of the marginal core removed from other parts.

Referring to Fig. 1 of the drawing, the numeral 1 indicates the main portion of the core for molding the interior of a hot water bottle. The numeral 2 indicates a core support having a flange 3 which forms the opening in the side of a hot water bottle through which the core is removed. The numeral 4 indicates the core for the neck portion of the bottle and terminates in a core support 5 from which a dowel pin 6 projects for centering and correctly locating the core for the neck within the mold when the parts are assembled.

When the core 1 is covered by a suitable sheet of unvulcanized rubber, the same is inclosed in the mold sections 7 and 8, which have suitable recesses therein to give the correct thickness to the walls of the hot water bottle, and are also provided with suitable sockets 9 and 10 within which the core supports 2 and 5 are respectively seated during the assembling of the mold prior to vulcanizing. The parts being thus assembled, the mold is placed in the vulcanizer and the rubber stock cured in the usual way. The two outer halves of the mold are then removed, the neck core 4 unscrewed from the main portion 1 which is then removed by pulling the same through the opening formed by the core supports 2 and 3. The rubber is sufficiently elastic to permit this without injuring the edges of the opening through which the core is passed. A vulcanizable cement is then applied to the edges of the opening through which the core was removed, or if preferred, a cement which may be vulcanized by sulphur-monochlorid may be applied thereto when it is desired to seal the opening by the cold-cure process, and the marginal core is then inserted through the neck of the bottle. This marginal core is illustrated in Figs. 4, 5 and 6, and consists of a rod 11 bent into the general shape of a hack-saw frame, clearly shown in Fig. 6. The straight or handle portion 12 of this frame has a longitudinal hole therethrough and its outer end is enlarged to form a flange or collar, as indicated at 13. Beyond this flange or collar 13 is a tubular portion 14 which is interiorly screwthreaded. The opposite end of the frame 11, as indicated at 15, is provided with a small socket 16 adapted to receive the end of the straight rod 17 of a suitable size to pass through the mold within the straight portion 12 of the frame 11. The rod 17 is also provided at its outer end with a screw threaded portion 18 and a knurled thumb-head 19. When it is desired to vulcanize the edge of the water bottle, the frame 11 is inserted through the neck of the bottle, the rod 17 being first removed. After the frame is approximately in position the rod 17 is passed through the hole in the straight portion 12 of the frame 11 and its outer end is seated in the recess or socket 16 in the end portion 15. The screw threaded portion 18 of the rod is then engaged with the interiorly screw-threaded portion 14 of the frame and the thumb-head turned a sufficient number of times to cause the frame 15 to expand to the position shown in Figs. 4 and 6. The frame 11 is then placed accurately in position and inclosed between the sections of a supplemental or secondary mold consisting of the parts 20 and 21 held together in the correct relative position by dowel pins 22. Section 21 of the supplementary mold has attached to one end thereof a lateral arm 23 having adjacent its outer end a transverse hole 24 through which the tubular portion 14 of the frame 11 is adapted to pass until the flange or collar 13 abuts against the lower side of said arm. The arm is provided with a screw-threaded longitudinal opening through which the set screw 25 passes in order to lock the tubular portion 14 in position in the hole 24. When the parts have been thus assembled the mold sections 21 and 20 may be supplied with heat by placing the same between heated platens of a vulcanizing press, or in any other preferred way. If the cold cure is used, the mold sections may be simply compressed during the curing process.

What I claim and desire to protect by Letters Patent is:

1. A molding core for hollow rubber articles, comprising a resilient rod forming a frame shaped to conform to the interior of said articles, and a removable strut for fixing the ends of said frame relatively when within said articles.

2. A molding core for hollow rubber articles, comprising a resilient bow-shaped frame, a removable strut adapted to expand the ends of said frame, and means for holding said strut adjustably in position.

3. A molding core for hollow rubber articles, comprising a resilient bow-shaped frame having a straight portion with an opening therethrough, a rod adapted to pass through said opening and to span the space between the ends of said frame, and means for fixing said rod in position within said opening.

4. A molding core for hollow rubber articles, comprising a resilient rod forming a bow-shaped frame, a tubular straight portion at one end thereof having internal screw-threads, and a straight rod adapted to pass through said tubular portion and span the space between the ends of said frame and having a screw-threaded portion adapted to engage said internal screw threads and to expand said frame.

Signed at Cleveland, Ohio, this 8th day of November, 1915.

EDWIN L. STIMSON.